Nov. 20, 1928.
W. M. GLOVER
1,691,969
ADJUSTABLE AUTOMOBILE AWNING
Filed May 9, 1927
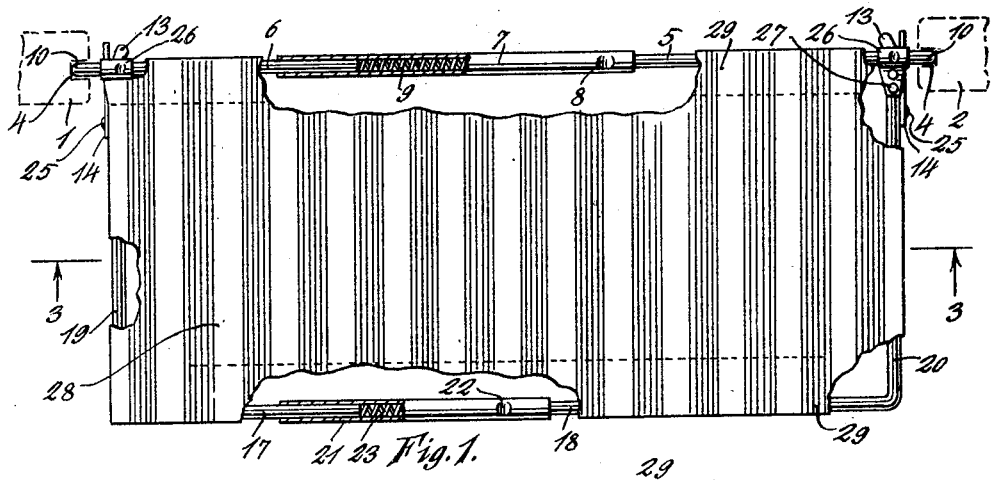
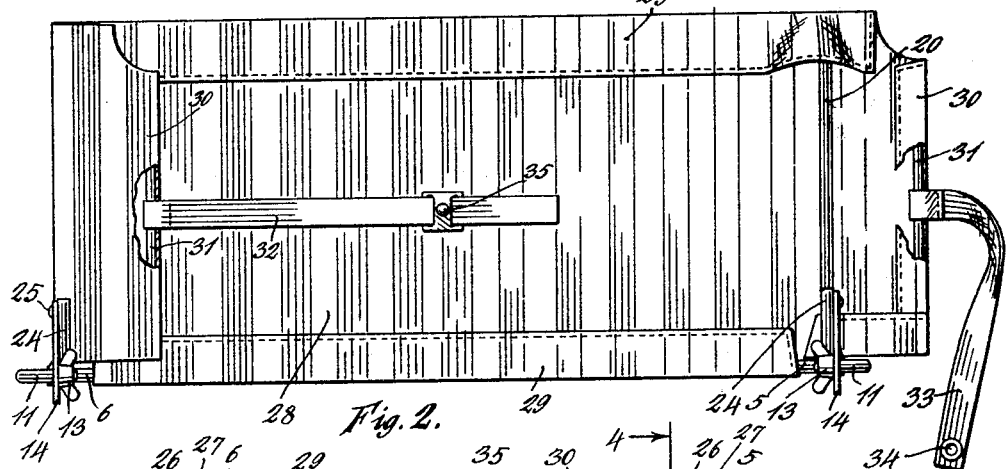
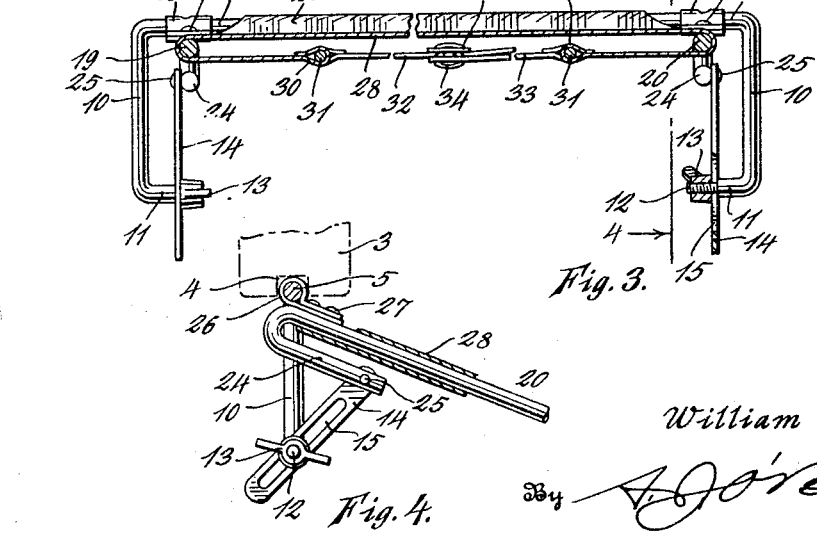
Inventor
William M. Glover.
By A. J. O'Brien
Attorney Patented Nov. 20, 1928.

1,691,969

UNITED STATES PATENT OFFICE.

WILLIAM M. GLOVER, OF DENVER, COLORADO, ASSIGNOR, BY MESNE ASSIGNMENTS, TO SUNBAR MANUFACTURING COMPANY, OF DENVER, COLORADO, A CORPORATION OF COLORADO.

ADJUSTABLE AUTOMOBILE AWNING.

Application filed May 9, 1927. Serial No 189,824.

This invention relates to improvements in automobile awnings of the type adapted to be attached to the side members of a window frame opening and relates more particularly to an improvement in the awning described in my copending application, Serial Number 123,411, filed July 19, 1926, of which this application is a continuation in part.

It is the object of this invention to produce an automobile awning of simple, substantial construction that can be conveniently put into place and removed and which can readily be adjusted.

The above and other objects that may become apparent as this description proceeds are attained by means of a construction and an arrangement of parts that will not be described in detail, reference for this purpose being had to the accompanying drawing in which the preferred embodiment thereof has been illustrated and in which:

Fig. 1 is a top plan view of my improved awning with portions removed so as to more clearly disclose the construction;

Fig. 2 is a bottom plan view of the awning, the canvas being unbuckled and portions thereof removed so as to more clearly disclose the construction;

Fig. 3 is a section taken on line 3—3, Fig. 1; and

Fig. 4 is a section taken on line 4—4, Fig. 3.

In the drawing numerals 1 and 2 represent the vertical side members of a window frame, and 3 the transverse member which connects members 1 and 2 at their upper ends. This window frame may be part of the door of an automobile or a part of the stationary body portion thereof. Members 1, 2 and 3 are provided with grooves 4 which serve as guides for the plate glass which forms the window. In automobile bodies, the glass can be raised and lowered by some suitable means so as to provide an opening between member 3 and the upper edge of the glass.

My improved awning is so constructed that it may be secured between members 1 and 2 by a friction means so that it may be put into place and removed without making it necessary to employ screws or any other fastening means. The awning frame is constructed in the following manner. Two bars 5 and 6 are telescopically connected by means of a tube 7. One end of this tube is secured to the end of bar 5 by means of an indented portion 8 which serves to hold it securely to the end of this bar. Within tube 7 is a spring 9, whose ends abut the adjacent ends of bars 5 and 6. Spring 9 is a compression spring and when it is compressed it tends to move the bars 5 and 6 away from each other. The outer ends of bars 5 and 6 are bent downwardly so as to form arms 10 that extend at right angles to the axes of the tubular member 7 and which are adapted to engage the grooves 4 in members 1 and 2. The length of the parts 5 and 6 and the spring 9 is such that when the end members 10 are put into place in the grooves 4, the assembly will remain in the position in which it is placed due to the friction produced by the ends 10 against the bottom of the groove. The straight parts 5 and 6 and the tube 7 are adapted to be located in the groove 4 in part 3 (Fig. 4). The length of the spring 9 is such that it permits the ends 10 to be moved towards each other through quite a distance so as to permit the assembly to be applied to window frames of different widths. The lower ends of parts 10 are bent inwardly in the manner indicated by reference numeral 11 in Figure 3 and terminate in a reduced portion 12 which is threaded for the reception of the nut 13. A link 14 is provided with a longitudinal slot 15 through which the threaded end 12 extends in such a manner that the link may be clamped in any desired position within the length of the slot 15. Cooperating with the assembly just described are two other frame members. These members have straight parts 17 and 18 whose ends 19 and 20, respectively, are bent at right angles. A tube 21 which corresponds to tube 7 is secured to the bar 18 by means of an indentation 22 and contains the spring 23. The end 17 is slidably connected with tube 21 and is engaged by the end of the spring in the manner shown in Figure 1. The parts 17 and 18 may be moved axially towards or away from each other in the same manner as parts 5 and 6. The upper or free ends of members 19 and 20 are bent reversely to an angle of one hundred eighty degrees and form rearwardly extending portions 24 to the ends of which one end of the links 14 are connected by means of a pivot pin 25. Members 19 and 20 are hingedly connected to members 5 and 6 by means of straps 26, whose central portions are curved about these bars in the manners shown in Figures 3 and 4. The ends of these straps are secured to members 19 and 20 by means of rivets or screws 27.

It will now be apparent from the above description that I have produced a frame of rectangular shape, one side of which is composed of parts 5 and 6 and the cooperating tube 7. The opposite side is formed by members 17 and 18 and cooperating tube 21. The ends of the frame are formed by members 19 and 20. The frame portion formed by parts 17, 18, 19 and 20 can therefore be rotated about the axes of parts 5 and 6. In order to hold the frame in adjusted position, the link 14 and the parts that cooperate with this in the manner shown in Figure 4 have been provided. When the parts 10 are located in grooves 4, the inclination of the frame may be adjusted to any desired angle and held in such adjusted position by the clamping action secured by nuts 13. A canvas 28 is secured to the frame. This canvas has been shown as provided along each of its opposite sides with a wide hem 29. The ends are provided with hems 30 in which are located bars 31. Straps 32 and 33 have their ends secured to the bars 31 and are provided with a snap fastener comprising portions 34 and 35. The part 35 can be adjusted along strap 32 so as to adjust the canvas to any size of frame. The two opposite sides of the frame comprising members 5, 6, 17 and 18 are located within the hems 29 and the ends of the canvas are bent about the end members 19 and 20.

From the above description it will be apparent that I have produced an awning whose frame is so constructed that it can fit window openings of different widths and which can be angularly adjusted and held in adjusted position. The mechanism for adjusting the frame angularly has been illustrated in Figure 4 and has heretofore been described. The fact that the length of the frame can be varied to a considerable extent, makes it possible to use the same frame for a variety of different sized openings, and this obviates the necessity of keeping a large stock of these awnings on hand, which would have to be done if a separate size were made for every separate window opening.

The construction of a canvas covering has also been designed in such a way that it can be easily fitted to frames of different makes. The adjustable feature of these awnings greatly simplifies the manufacture and reduces the cost, and in this manner the awning can be more cheaply manufactured and handled at a smaller cost than awnings having a fixed size.

Having thus described the invention what is claimed as new is:

1. An awning adapted to fit within a window opening provided with grooves at its sides to slidably mount a glass closure for the window opening, said awning comprising, in combination, a frame having one of its sides formed from two bars telescopically connected by means of a tubular member, a spring interposed between the ends of said members, said members having their outer ends bent to form downwardly extending fingers adapted to fit into the grooves and frictionally grip the side walls of the window opening to removably retain the awning in place, an elongated U-shaped frame hingedly secured to the two part side member so that it may be rotated about the axis of said side member and adjustable means for holding the frame in any desired position.

2. An automobile awning supporting frame comprising, in combination, a side member having a substantially straight central section provided at its ends with end portions bent at right angles and located in the same plane, said end portions being adapted to engage in parallel spaced grooves, an elongated U-shaped frame member having its ends hingedly connected with the side member so as to form therewith a rectangular frame and provided with downwardly projecting reversely extending parts and means extending from the downwardly extending parts of the U-shaped frame member to the end portions of the side member for regulating the inclination of the U-shaped member.

3. An automobile awning supporting frame comprising, in combination, a side member formed from two L-shaped bars having their stem portions arranged in axial alignment, means comprising a tube for holding said bars in alignment, a spring interposed between the adjacent ends of the bars, an elongated U-shaped frame connected to the side member by means which permits it to be oscillated about the axis of the side member and means for holding said frame and side member in adjusted position.

4. An automobile awning frame adapted to fit within a window opening provided with grooves at its sides, said frame comprising, in combination, a side member formed from two L-shaped bars, a tubular member secured to the stem of one of said bars, the stem of the other bar being slidable in said tube, a compression spring within said tube, said spring being located between the ends of said bars, an elongated U-shaped frame member secured to the side member so as to form therewith a rectangular frame, the U-shaped frame being adapted to oscillate about the axis of the side member, and means for clamping the U-shaped frame against rotation with respect to the side member.

5. An automobile awning frame adapted to fit within a window opening provided with grooves at its sides, said frame comprising, in combination, a side member formed from two L-shaped bars, a tubular member secured to the stem of one of said bars, the stem of the other bar being slidable in said tube, a compression spring within said tube, said spring being located between the ends of said bars, an elongated U-shaped frame member comprising a straight central portion having its ends bent at right angles so as to project from the same side and lie in the same plane, the extreme ends of said end portions being bent reversely through an angle of substantially one hundred eighty degrees, means for hingedly connecting the U-shaped frame to the side member so as to form with the latter a rectangular frame and means for holding said U-shaped frame in adjusted position with respect to the side member.

6. An automobile awning supporting frame comprising in combination, a side member having a substantially straight central portion provided at its ends with end portions at right angles to the central portion and located in the same plane, said end portions being adapted to engage parallel spaced grooves, an elongated U-shaped frame member having its ends hingedly connected with the side member so as to form therewith a rectangular frame, the said ends having parts projecting downwardly out of the plane of the body of the U-shaped member, and means extending from the end portions of the side member to the downwardly bent ends of the U-shaped member for regulating the inclination of the U-shaped frame member.

7. An automobile awning supporting frame comprising, in combination, a side member having a substantially straight central portion provided at its ends with end portions at right angles to the central portion and located in the same plane, an elongated U-shaped frame member having its ends hingedly connected with the side member so as to form therewith a rectangular frame, and bent reversely downwardly out of the plane of the body of the U-shaped member, and an operative connection between the end portions of the side member and the reversely bent ends of the U-shaped frame for regulating the inclination of the latter.

8. An automobile awning supporting frame comprising in combination, a side member having a substantially straight central portion provided at its ends with end portions at right angles to the central portion and located in the same plane, said end portions being adapted to engage parallel spaced grooves, an elongated U-shaped frame member having its ends hingedly connected with the side member so as to form therewith a rectangular frame, and bent reversely downwardly out of the plane of the body of the U-shaped member, and adjustable means connecting the said groove-engaging parts with the reversely bent ends of the U-shaped frame for regulating the inclination of the latter.

9. An automobile awning supporting frame comprising, in combination, a side member having a substantially straight central portion provided at its ends with end portions at right angles to the central portion and located in the same plane, said end portions being adapted to engage parallel spaced grooves, an elongated U-shaped frame member having its ends hingedly connected with the side member so as to form therewith a rectangular frame, and bent reversely downwardly out of the plane of the body of the U-shaped member, and links connecting the said groove-engaging parts with the reversely bent ends of the U-shaped frame for regulating the inclination of the latter.

10. An automobile awning supporting frame comprising, in combination, a side member having a substantially straight central portion provided at its ends with end portions at right angles to the central portion and located in the same plane, said end portions being adapted to engage parallel spaced grooves, an elongated U-shaped frame member having its ends hingedly connected with the side member so as to form therewith a rectangular frame, and bent reversely downwardly out of the plane of the body of the U-shaped member, and slotted links adjustably connected with the said groove-engaging parts and pivotally connected with the reversely bent ends of the U-shaped frame for adjusting the inclination of the latter.

11. An automobile awning supporting frame comprising, in combination, a side member having a substantially straight central portion provided at its ends with end portions at right angles to the central portion and located in the same plane, said end portions being adapted to engage parallel spaced grooves, an elongated U-shaped frame member having its ends hingedly connected with the side member so as to form therewith a rectangular frame, one of said ends being bent reversely downwardly out of the plane of the U-shaped member, and an operative connection between said reversely bent end of the U-shaped member and one of the groove-engaging parts of the said side member for tilting the U-shaped frame.

12. An automobile awning supporting frame comprising a side member having groove-engaging parts, a U-shaped frame whose end members are hingedly connected with the said side member, one of said end members being bent reversely downwardly, and a link connecting one of the groove-engaging parts with said reversely bent member for tilting the U-shaped frame.

In testimony whereof I affix my signature.

WILLIAM M. GLOVER.